(12) United States Patent
Beck et al.

(10) Patent No.: US 11,055,461 B1
(45) Date of Patent: Jul. 6, 2021

(54) DESIGNING SEMICONDUCTOR CIRCUIT TEST ELEMENTS

(71) Applicant: International Business Machines Corporation, Armonk, NY (US)

(72) Inventors: Manuel Beck, Kirchheim unter Teck (DE); Marvin von der Ehe, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/930,493

(22) Filed: May 13, 2020

(51) Int. Cl.
*G06F 30/392* (2020.01)
*G01R 31/3177* (2006.01)
*G06F 30/333* (2020.01)
G06F 119/12 (2020.01)
G06F 119/02 (2020.01)

(52) U.S. Cl.
CPC ....... *G06F 30/333* (2020.01); *G01R 31/3177* (2013.01); *G06F 30/392* (2020.01); *G06F 2119/02* (2020.01); *G06F 2119/12* (2020.01)

(58) Field of Classification Search
CPC .. G06F 30/333; G06F 30/392; G06F 2119/12; G06F 2119/02; G01R 31/3177
See application file for complete search history.

(56) References Cited

U.S. PATENT DOCUMENTS

| | | | |
|---|---|---|---|
| 6,539,536 B1 | 3/2003 | Singh | |
| 2008/0256274 A1* | 10/2008 | Wohl | G01R 31/318547 710/68 |
| 2009/0288045 A1* | 11/2009 | Chien | G06F 30/327 716/103 |
| 2011/0296264 A1 | 12/2011 | Chandra | |
| 2013/0166976 A1* | 6/2013 | Huang | G06F 30/398 714/727 |
| 2016/0011258 A1* | 1/2016 | Liao | G01R 31/318583 714/727 |
| 2018/0096091 A1* | 4/2018 | GopalaKrishnaSetty | G01R 31/31723 |
| 2018/0164376 A1 | 6/2018 | Ge | |
| 2018/0307792 A1 | 10/2018 | Kim | |
| 2020/0004913 A1 | 1/2020 | Goel | |

* cited by examiner

*Primary Examiner* — Nghia M Doan
(74) *Attorney, Agent, or Firm* — David K. Mattheis; William H. Hartwell; Nicholas L. Cadmus (57) ABSTRACT

Semiconductor device design automation by receiving an initial semiconductor design, identifying scannable cells according to the semiconductor design, determining scannable cell locations, identifying a cluster of scannable cells among the scannable cells according to the locations, forming a scan chain configured to connect at least some of the scannable cells of the cluster, identifying a scan chain cluster including the scan chain logical connections; and generating a scan chain scan-multiplexer location for scan chain clusters.

17 Claims, 6 Drawing Sheets

DESIGNING SEMICONDUCTOR CIRCUIT TEST ELEMENTS

BACKGROUND

The disclosure relates generally to methods for automated semiconductor device design. The disclosure relates particularly to generating scannable cell scan chains and scan chain connector locations for a design for testing semiconductor device design.

Scan chaining is a design for testing technique used in creating semiconductor device designs. Semiconductor device latches, or scannable cells, are linked together into scan chains of scannable cells. Scannable cells are device elements having additional connections enabling scanning of the cells at appropriate stages of the device manufacturing process to identify, and distinguish between, viable and faulty devices. Each scan chain includes pin-in and pin-out connections between child and parent hierarchy level elements, or pin-in and pin-out connections to a scan multiplexer connection and then to a scan control element of the device. The scan multiplexer connects to a plurality of scan chains. Each scan chain connected to the scan multiplexer has a scan type identifying the nature of the scan test for the scan chain.

The scan control element monitors and controls the scannable cells of the scan chain during testing sequences. Each level of the semiconductor device hierarchy includes scannable cells which must be organized into scan chains and provided with connectors—pin-in and pin-out, or scan multiplexer connections.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable generating design-for-test circuit element connections to semiconductor device designs.

Aspects of the invention disclose methods, systems and computer readable media associated with semiconductor device design automation by receiving an initial semiconductor design, identifying scannable cells according to the semiconductor design, determining scannable cell locations, identifying a cluster of scannable cells among the scannable cells according to the locations, generating a scan chain configured to connect at least some of the scannable cells of the cluster, and generating a scan chain scan-multiplexer, or scan pin location, for the scan chain.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., identifying design scannable cells, determining scannable cell locations within a semiconductor device hierarchy, clustering scannable cells according to their locations, generating scan chain designs linking clustered scannable cells, generating scan multiplexer and scan pin locations, etc.). These solutions are not abstract and cannot be performed as a set of mental acts by a human due to the processing capabilities needed to facilitate automatic semiconductor device design modifications, for example. Further, some of the processes performed may be performed by a specialized computer for carrying out defined tasks related to memory operations. For example, a specialized computer can be employed to carry out tasks related to automated semiconductor device design, or the like.

Design for testing device scan chains include device scannable cells, or cells. connected in series as a scan chain. Scannable cells include device logical flip-flops and a scan-pin pair of a larger random logic block (child hierarchy). For a large child block having several scan-pin pairs of different scan types, disclosed methods treat each pin pair separately when iterating over scan types and scan regions. The scan chains are formed by logically and then physically connecting the scan pin-out of the first scannable cell to the scan pin-in of a second scannable cell, and so on. Scan chains are formed at each level of the device design hierarchy enabling cell viability testing during device manufacturing. After formation, scan chains are connected to scan pin-ins or a scan multiplexer according to the center-of-gravity of the formed scan chain. Scan chains are activated through scan chain pin-in and pin-out circuitry connected to scan control elements. The scan control elements monitor the scan chain response to the test, checking scan chain element viability. Scan chain circuitry typically serves no purpose in the functionality of the final device. Optimizing scan chain design includes limiting the resources committed to fabricating the scan chains—e.g., keeping the scan chain internal connectors as short as possible while allowing for complete testing of device scannable cells for each device design hierarchy level. Disclosed methods and systems detail the formation of clusters of scannable cells followed by the generation of internal scan chain connections and the formation of one or more scan chains from each cluster of scannable cells at each device hierarchy level.

The initial design includes scannable cells, each scannable cell having individual scan pin-in and pin-out. The initial design need not include scan chain connections between the scannable cells of the scan chain, or connections between scan chains and scan control elements—scan chain pin-in and pin-out or scan chain multiplexer (mux) connections. For a given device design, application of clustering methods to an initial design yields groups of scannable cells suitable for forming into scan chains. In this embodiment, the design parameters specify the maximum number of scannable cells per scan chain—the scan chain length. Clustering methods consider the location of scannable cells not the maximum scan length in defining clusters. In this embodiment, a cluster may contain more scannable cells than an exact multiple of the maximum scan chain length, e.g., a cluster contains 17 scannable cells while the design parameters specify a maximum scan chain length of 8 scannable cells, leaving one extra scannable cell in the cluster. In this embodiment, the method evaluates the relative costs of forming a new scan chain with the extra scannable cell and the cost of shifting the scannable cell to another cluster.

The disclosed methods and systems further provide details for generating optimized scan multiplexer locations for chained-up scannable cells that need to be connected to a scan multiplexer, and for generating pin-in and pin-out locations for chained-up scannable cells lacking a scan multiplexer. In an embodiment, a design parameter specifies the maximum scan chain capacity for a scan chain mux. In this embodiment, for clusters containing more scan chains than the scan chain mux capacity, the method evaluates the relative costs of adding a new scan chain mux for the extra scan chains of the cluster and shifting the extra scan chains to another cluster.

In an embodiment, in generating the scan chains and scan chain pin-in/pin-out or scan chain mux locations, the method generates revised designs including the additional wiring connections needed for the scan chains and scan chain external connections. In this embodiment, the method generates the logical connections between scannable cells as well as between scan chains and scan chain muxes or pin-in/pin-out locations, together with wire tags indicating the relevant device routing layers to be used by a design routing tool utilizing the output of the method. The method does not alter the locations of device scannable cells. In this embodiment, the method provides modified designs to the net list (circuit schematics) as well as to the logic designer for verification of the design logic.

In an embodiment, the automated design method receives an initial device design. The device design includes one or more hierarchical levels of the semiconductor device design. Each level includes a collection of connected device elements including scannable cells having scan in and scan out connections for design for testing methods. For each level and each element of the level, the design includes device element scan pin coordinates, scan type—functional scan, array built-in scan, etc.—scan region, whether multiplexed or pin-in/pin-out for child cells having a parent element in another hierarchy level, element instance name to enable unambiguous identification and description of scan chain elements, and the maximum scan chain length.

In this embodiment, the method reviews the design details to identify each scannable cell together with the hierarchical level, cell location, scan type, and other cell design details. The method determines the locations of each scannable cell and groups the scannable cells into scannable cell clusters of each hierarchy level according to scan type. The method then considers each of the two scan types in turn. For each scan type, the method divides the level into tiles of equal size and counts the number of scannable cell pins in each tile.

In an embodiment, tile dimensions a, and b, relate to design dimensions A and B, such that the tile ratio a/b=1, are determined as follows:

$$a \approx b = \frac{c_R}{2} \Rightarrow n = \left\lceil \frac{2A}{c_R} \right\rceil; m = \left\lceil \frac{2B}{c_R} \right\rceil \Rightarrow a = \frac{A}{n}; b = \frac{B}{m}$$

where: $a, b$ = tile dimensions $c_R$ = cycle reach distance (routing on low metal layers, scan timing)

$A, B$ = design dimensions

After determining the number of scan pins in each tile of the hierarchy level for the particular scan type and scan region, the method evaluates the distribution of pins across the tiles, checking to determine the range of pins/tile values and determining the difference between the maximum pins/tile and the minimum pins/tile. The method treats designs having maximum and minimum values which are similar as having evenly distributed scan pins and utilizes a non-density-based unsupervised clustering algorithm, such as k-means clustering, to cluster the hierarchy level scan pins. In an embodiment, the method evaluates a distribution factor such as the standard deviation of the pins/tile distribution divided by the average pins/tile of the distribution, against a threshold value. In this embodiment, distributions having a distribution factor smaller than or equal to 1.5 are considered evenly distributed.

In an embodiment, the method determines the calculated number of clusters ($N_{clusters}$), for a hierarchy level as follows:

$$N_{clusters} = N_{scannableCells}/(\text{scanLength}_{max} \cdot c_{maxFill})$$

where $N_{scannableCells}$ is the total number of scannable cells of the current type in the design level scanLength$_{max}$ is the maximum allowed number scannable cells in a scan chain $c_{maxFill}$ is a tuning parameter adjusted as needed to yield clusters of a desired size.

In an embodiment, a tuning factor $c_{maxfill}$ having a value between 0 and 1 inclusive provides enough clusters such that scan chains are not all filled to their maximum length. This helps enable shifting scan cells to other scan chains as needed.

For levels having an uneven distribution of scan pins across the tiles, e.g., with a calculated distribution factor greater than 1.5, the method utilizes a density based unsupervised learning algorithm such as density-based spatial clustering of applications with noise (DBScan) wherein the algorithm determines the number of clusters during its analysis of the scannable cells of the level.

For cases where neither k-means nor DBScan yields satisfactory clusters of scan cells, the scan cells are clustered according to the tiles, each tile defining a cluster of scan cells. As one example, a density-based clustering yielding a single cluster for all scan cells, or a cluster for each single scan cell, would be unacceptable and would require the use of tile clustering. As a second example, clustering attempts for levels having few scan cells of a single type, which are also unevenly distributed, may fail with all the scan cells identified as outliers and without the formation of clusters of the scan cells.

In an embodiment, after clustering scannable cells, the method determines a "center of gravity" (CoG) of each cluster of cells. In this embodiment, the method determines the CoG as the point within the cluster having the most even distribution of scannable cells around it. In an embodiment, the method determines the cluster CoG as the average center point of the cluster:

$$x_{CoG} = \Sigma_{i=1}^{n}(x_n)/n,$$

$$y_{CoG} = \Sigma_{i=1}^{n}(y_n)/n$$

After determining the cluster CoG, the method forms scan chains, beginning with the scannable cell closest to the CoG and using an algorithm such as "nearest neighbor" to proceed in building the scan chain. The method stops adding to the first scan chain after reaching the maximum scan chain length for the type of scannable cells being evaluated. The method then begins building a second scan chain starting with the next remaining scannable cell closest to the cluster CoG. In an embodiment, the method determines a CoG for the remaining scan cells of the cluster and begins the next scan chain with the scan cell nearest to the new CoG. This process continues until there are fewer scannable cells remaining in the cluster than a complete scan chain length. For these extra scannable cells, the method utilizes a cost function, evaluating the relative costs associated with adding another scan chain for the current cluster versus shifting the extra cells to another cluster. Scan cells shifted to a different cluster are then processed into scan chains for that cluster.

In an embodiment, the cost function considers the cost/distance to the next nearest cluster CoG ratio and the number of extra scan pins in the current cluster in determining whether to add an additional scan chain or move the extra scan cells to another cluster. An exemplary cost function includes:

$$J_{cost}^{scanPin} = 1 - a\frac{dist_{nn}}{c_R} - b\frac{pin_{remain}}{scanLength_{max}}$$

where:

$dist_{nn}$ distance to nearest–neighbor$CoG$ $a, b$ are the parameters for tuning cost function $pin_{remain}$ is the number of remaining scannable cells in cluster $scanLength_{max}$ is the max allowed number scannable cells in a scan chain $J_{cost}^{scanPin} \geq 0.5 \rightarrow$ assign remaining scannable cells to $nn\,CoG$ $J_{cost}^{scanPin} < 0.5 \rightarrow$ assign remaining scannable cells to new scan chains.

For each type of scan cells, after determining the scan chains of each cluster of scan cells, the method determines and generates scan chain external connection points. In an embodiment, the scan chain connection points include pin-in and pin-out for non-multiplexed scan cells. In an embodiment, the scan chain connection points include scan mux in and scan mux out for each scan chain. In this embodiment, multiple scan chains connect to a common scan mux.

In this embodiment, the method defines a CoG for each of the defined scan chains. The method clusters scan chains according to the location of the respective scan chain CoGs, using a clustering algorithm such as k-means. Scan chains of different scan types can be connected to a common scan chain mux. Scan regions cannot be mixed in a scan mux. The method iterates over scan regions and separates scan chain clustering (of all scan types) in each region. In this embodiment, the method determines a number of scan chain clusters in a manner similar to that described above and used to determine the number of scan cell pin clusters. For each scan chain cluster, the method assigns scan chains up to the capacity of the scan mux. After assigning scan chains, the method defines a CoG for the set of scan chains assigned to the scan mux and places the scan mux at the coordinates of this CoG. The method defines the scan mux-in point at the CoG of the set of scan chains assigned to the scan mux. The method generates wiring routes from the scan chain CoGs to the scan mux-out pin for a scan mux control element.

In an embodiment, the method closes the loop of the scan chain connecting the first and last scan cells. For each scan chain, the method then identifies the scan cell closest to the pin-out of the scan mux and connects the scan mux pin-out to the pin-in of this closest scan cell. The method then identifies if the preceding or following cell in the looped scan chain is closer to the pin-in of the scan mux. The pin-out of this cell is subsequently connected to the pin-in of the scan mux. The method then sets the scan type attribute of the respective scan mux pin-in/pin-out pair to the scan type dictated by the scan cells of the scan chain. In this embodiment, after the method identifies the logical connections to form scan chains from scan cells and to connect scan chains to scan muxes, the results are passed to a design routing tool which adds the necessary wiring connections to the schematic. As an example, a scan mux allowing the connection of 16 scan chains, would have 16 pin-in/-out pairs, each having a scan type attribute dictated by the scan chain connected to that pair. The scan mux would further have control inputs (fed by DFT logic) which set the scan type that is currently tested.

For extra scan chains of the cluster—scan chains remaining after assigning scan chains up to the capacity of the scan mux—the method utilizes a cost function balancing the relative costs of adding another scan mux for the level and shifting the extra scan chains to another cluster. In this embodiment, the method utilizes cost function:

$$J_{cost}^{scanMux} = 1 - a\frac{dist_{nn}}{c_R} - b\frac{scanRing_{remain}}{scanMuxSize}$$

where:

$dist_{nn}$ distance to nearest–neighbor $CoG$;

$a, b$ are the parameters for tuning cost function;

$scanRing_{remain}$ is the number of remaining scan chains in cluster;

$scanMuxSize$max is the allowed number scan chains per scan–mux;

$J_{cost}^{scanMux} \geq 0.5 \to$ assign remaining scan chains to $nn$ scan–mux; and $J_{cost}^{scanMux} < 0.5 \to$ assign remaining scan chains to new scan–mux After completing the scan chain generation and scan chain external connector process for multiplexed scan cells, the method begins again evaluating the non-multiplexed scan cells of each device design hierarchy level. The method again determines scan cell clusters, defines scan chains within each cluster up to a defined scan chain length, beginning with the scan cell nearest a determined for the cluster of scan cells. Extra scan cells are evaluated using a cost function to balance the costs of adding a scan chain for the cluster and moving the extra scan cells to another cluster.

After all scan cells are distributed to generated scan chains, the method generates scan chain pin-in and pin-out locations for each scan chain. The method generates the scan chain pin-in location in association with the location of the scan pin-in of the first scan cell of the chain and generates the scan chain pin-out in association with the location of the scan pin-out of the last scan cell of the chain.

Figure 1:
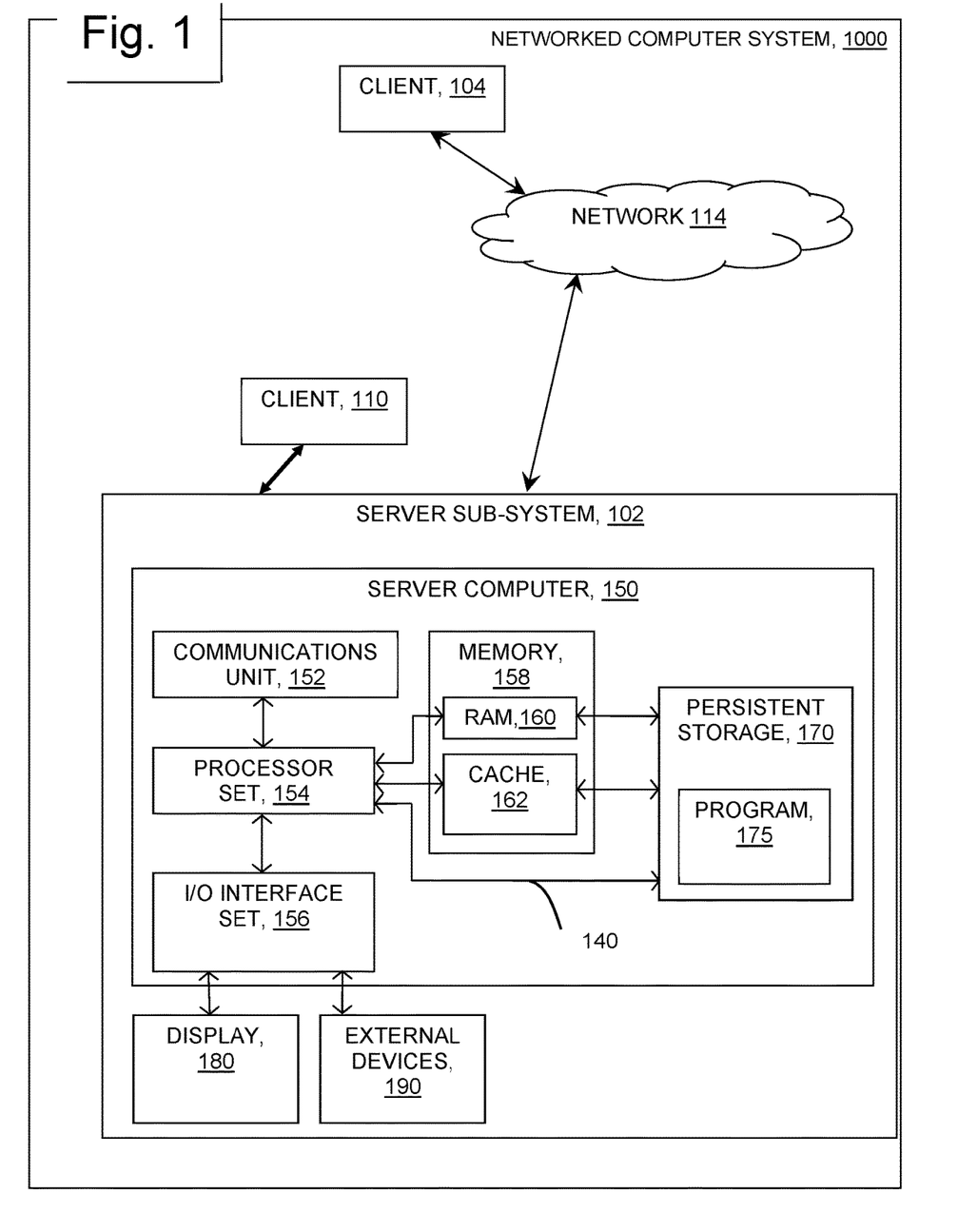
FIG. 1 provides a schematic illustration of a computing environment according to an embodiment of the invention.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise semiconductor device design program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the semiconductor device design program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s)

190 can also include portable computer readable storage media such as, for example, thumb drives, portable optical or magnetic disks, and memory cards. Software and data used to practice embodiments of the present invention, e.g., semiconductor device design program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2A:
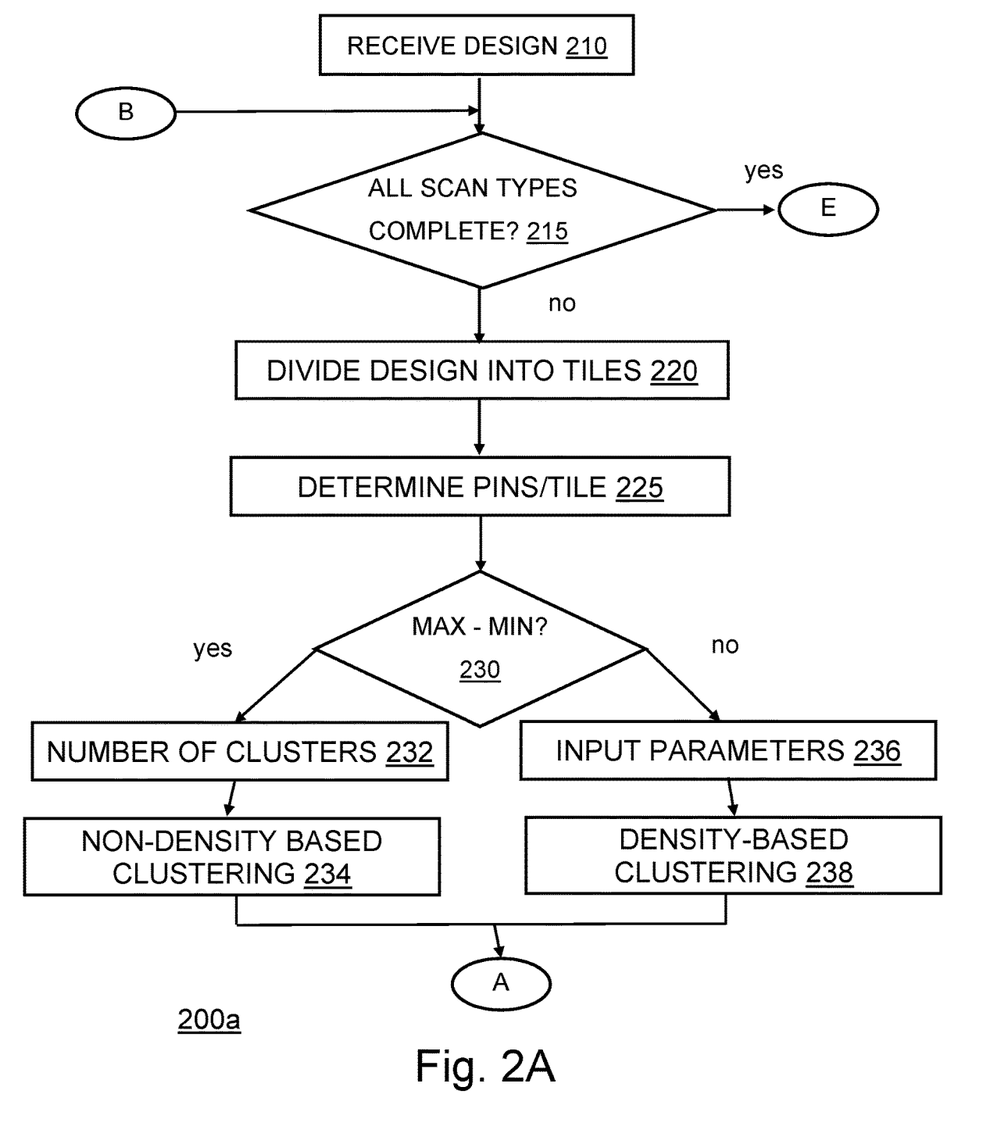
FIGS. 2A-2D provide flowcharts depicting operational steps, according to an embodiment of the invention.

FIG. 2A provides a flowchart 200a, illustrating exemplary activities associated with the practice of the disclosure. After program start, at block 210, the method receives an initial device design including multiple hierarchical levels, each level including numerous scan cells. The method evaluates the design one hierarchical level at a time. The initial design includes scan pin location coordinates for each scan cell. The design further includes scan cell scan type, scan region, whether multiplexed or not, scan instance name data, and internal scan length associated with the cell for each scannable cell of the design. In the case that the scannable cell is a random logic macro, this cell might have several scan-pin pairs of different scan types. Associated with each pin pair is an internal scan length greater than 1 and less than a maximum scan chain length. The method treats each scan-pin pair separately. A maximum scan chain length is defined for each scan type in each scan region in the design for test specifications as a constraint. Each scan type has a listing of associated scannable cells. At block 215, for each level of the design, the method checks to determine whether all scan types of the design have been evaluated. If not, for each scan cell type for each scan region of each level, the method proceeds to block 220 and divides the hierarchical level into tiles according to the tile dimension calculation described above. At block 225, the method determines the number of scan cell pins per tile. At block 230 the method evaluates the number of scan cell pins per tile across the set of tiles including evaluating the maximum number of scan cell pins/tile and the minimum number of scan cell pins/tile to determine if scan cell pins are evenly or unevenly distributed. Scan cell pins in designs where the maximum and minimum number of scan cell pins/tile are roughly equivalent are considered evenly distributed, otherwise the scan cell pins/tile are considered to be unevenly distributed.

At block 232, for evenly distributed scan cell pins, the method determines a number of clusters as described above. The method uses the determined number of clusters as an input to the application of a k-means clustering algorithm to the scan cells of the level at block 234. In an embodiment, input parameters extracted from the design include the x-y coordinates of the scannable cells, the scan length of each scannable cell, and the scan type/scan region of each scannable cell.

For levels having unevenly distributed scan cell pins/tile, the method extracts the necessary input parameters from the device design at block 236 and applies a density-based clustering algorithm, block 238, such as DBScan to the scan cells of the level using the input parameters. In an embodiment, input parameters extracted from the design include the x-y coordinates of the scannable cells, the scan length of each scannable cell, and the scan type/scan region of each scannable cell.

Figure 2B:
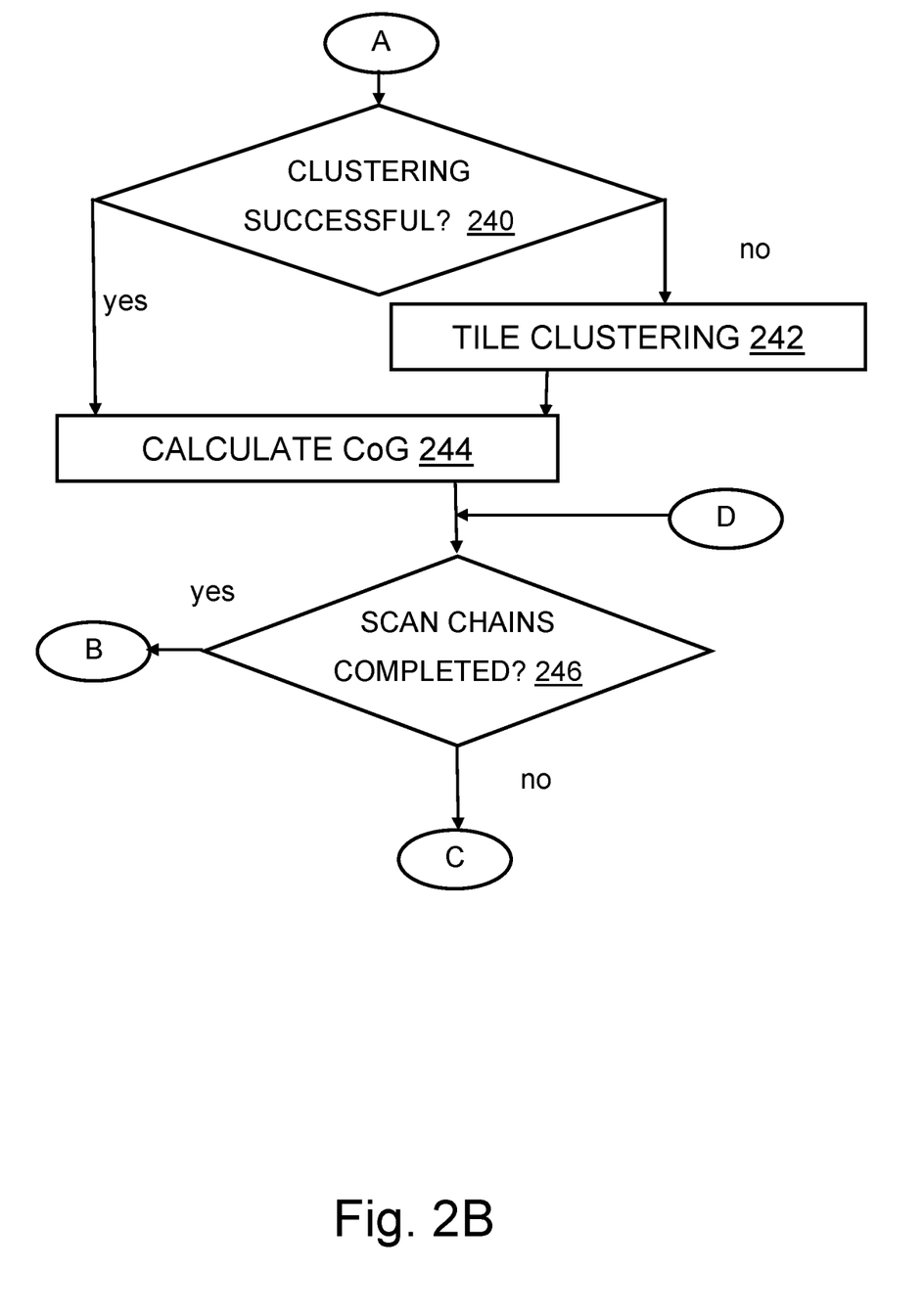

Referring now to FIG. 2B, at block 240, the method of semiconductor design program 175 determines if either the even distribution or uneven distribution clustering algorithms have successfully clustered the scan cell pins.

At block 244, the method of program 175 determines the CoG of each successfully identified cluster of scan cell pins. At block 242 the method uses tile clustering methods to cluster scan cell pins according to the tiles applied to the design after failing to successfully cluster the scan cell pins. For example, the method uses tile clustering when clustering yields a single cluster for all scan pins, or a cluster for each scan-pin pair, or when DBScan yields no clusters, having labeled each scan-pin pair as an outlier for the level instead.

At block 246 the method determines if scan chains have been generated for all clusters of the design level. When all scan cell pin clusters have been assigned to scan chains, the method proceeds back to block 215. When all scan pins have not been assigned to scan chains, the method progresses to block 250 of FIG. 2C. At block 250 the method generates scan chains for each cluster beginning by assigning the nearest scan cell to the CoG of the cluster to the scan chain and progressing among the scan cells of the cluster using a nearest neighbor or other travelling salesman algorithms to sequentially assign scan cells to the scan chain. For any initial scan cell, the nearest neighbor algorithm determines the next cluster scan cell closest to the initial scan cell.

Figure 2C:
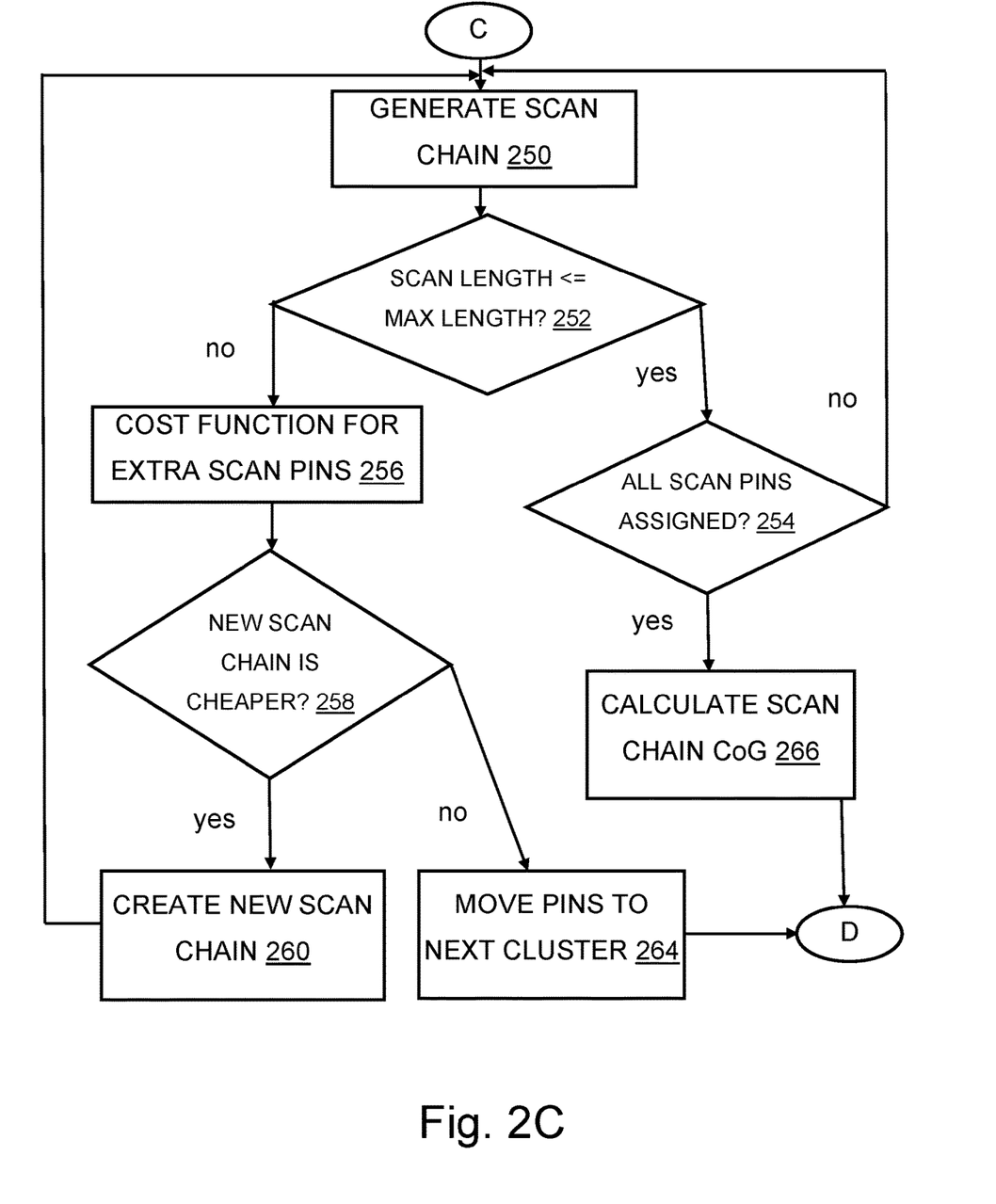

After the addition of each scan cell to a scan chain, the method checks the scan chain length against a defined scan chain max length, at block 252. For scan chains less than or equal to the max scan chain length, the method checks for unassigned scan cell pins at block 254. When all scan cell pins are assigned to a scan chain, the method moves to block 266 and determines the CoG of each assigned scan chain. Unassigned pins are assigned to a scan chain at block 250. After reaching the max scan chain length according to block 252, the method determines if there are extra scan cell pins. When there are extra scan cell pins, the method proceeds to block 256 to determine what to do with extra scan cell pins.

At block 256 the method applies a cost function to any extra scan cell pins. For extra, unassigned scan cell pins, the method determines at block 258, either that an extra scan chain should be added to the design, block 260, or that the extra pins should be shifted to another cluster awaiting assignment of scan cell pins to scan chains, block 264.

After calculating a CoG for each scan chain and shifting extra pins to another cluster, the method returns to block 246, determining if all scan cell pins in each cluster have been assigned to scan chains. The method proceeds as described above until all scan cell pins have been assigned to scan chains and all CoGs have been calculated for all scan chains, returning then to block 215.

Figure 2D:
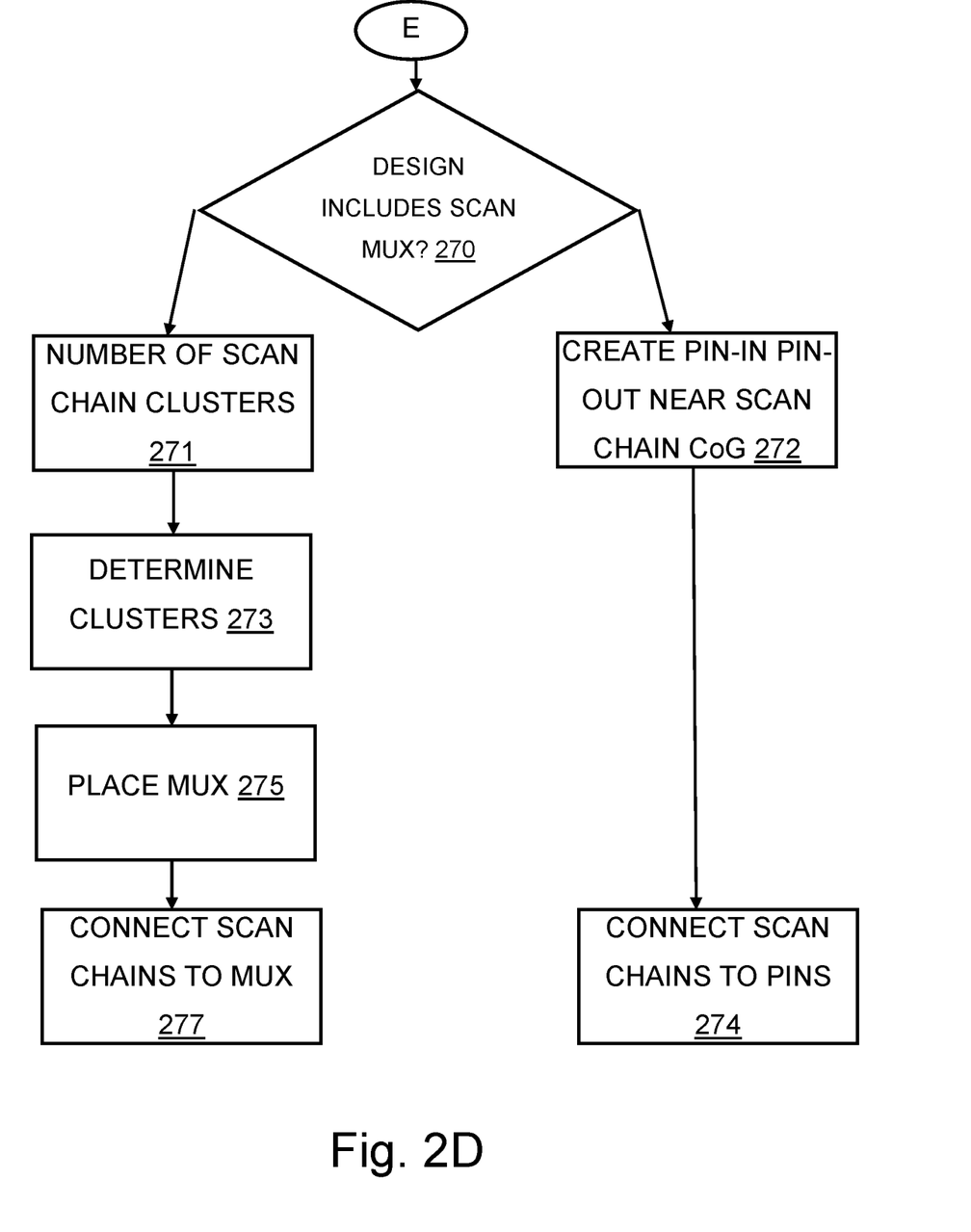

At block 215, after all scan types are complete, the method moves to block 270 of FIG. 2D. At block 270, the method determines if usage of scan muxes is allowed and/or necessary for the design level. Scan mux usage may be forbidden, or the quantity of scannable cells may not warrant the use of a scan mux for the level. At block 271, the method determines the number of scan chain clusters as described above. At block 273, the method uses a clustering algorithm such as k-means to divide the scan chains into clusters of scan chains. At block 275, the method determines CoG for each scan chain cluster and places the scan mux for each cluster at the determined CoG of that cluster.

In an embodiment, the method connects scan chains to the scan chain mux up to the capacity limit of the mux at block 277. For each scan chain, the method identifies the scan cell closest to the pin-out of the scan mux and connects the scan mux pin-out to the pin-in of this closest scan cell. The method then identifies if the preceding or following cell in the looped scan chain is closer to the pin-in of the scan mux. The pin-out of this cell is subsequently connected to the pin-in of the scan mux. Extra scan chains are then evaluated using a cost function to evaluate the relative costs of creating a new mux or shifting the extra scan chains to a separate scan chain cluster, as described above. The method continues processing scan chains until all scan chains are assigned to a scan chain mux.

For scan chains without scan chain muxes, or in levels of hierarchy in which the usage of scan muxes is forbidden, the method generates pin-in and pin-out locations to the parent level of the hierarchy at block 272. In an embodiment, the method defines the pin-in locations at a point on the edge of the current design hierarchy which is closest to the CoG of the cluster. The method determines the scan chain pin-out location according to the scan cell pin-out location of the final scan cell of each scan chain of the cluster—again finding the closest edge of the current design hierarchy. In this embodiment, the method continues determining scan chain pin-in and pin-out locations for each (remaining) scan chain, according to the CoG of that scan chain. At block 274, the method connects scan chains to the scan chain pin-in and pin-out locations.

In an embodiment, the disclosed methods for evaluating semiconductor device designs and implementing scan chains and scan chain connectors require more resources than those available through a local computing environment. In this embodiment, cloud or edge cloud resources provide the additional computing resources needed for the evaluation of device designs including hundreds of thousands, or more, scannable cells.

Views 3A-3D of FIG. 3, provide a schematic illustration of the evolution of a circuit design, according to an embodiment of the disclosed inventions. The figures provide a simplified view of the progression of circuit design evolution according to an embodiment. View 3A illustrates an initial circuit design including multiple scannable cells 310, each element in View 3A represents a scannable cell 310. View 3B illustrates the grouping of the scannable cells 310 into clusters 320, according to their relative locations. Each cluster 320 includes a cluster center of gravity 330 determined according to the locations of the scannable cells 310 of the cluster 320.

Figure 3A:
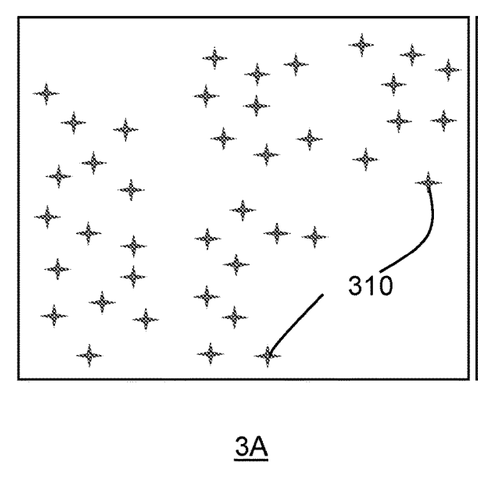
FIG. 3 depicts a progression of steps in circuit modification, according to an embodiment of the invention.
Figure 3B:
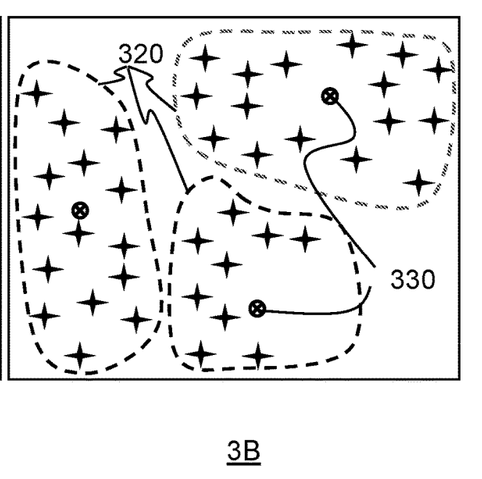
Figure 3C:
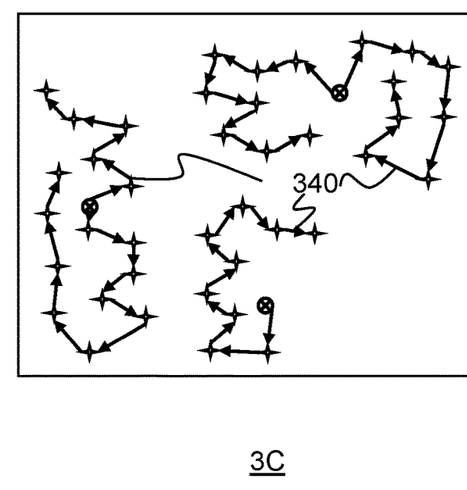
Figure 3D:
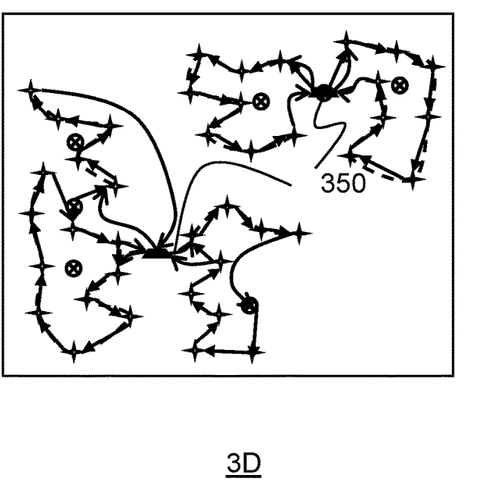

View 3C illustrates the formation of scan chains 340, for the scannable cells 310 of the clusters 320. Each scan chain originates at the center of gravity 330, of the cluster 320. View 3D illustrates the clustering of scan chains and the attachment of the scan chains to scan multiplex contacts 350.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for semiconductor device design, the method comprising:
    receiving, by one or more computer processors, an initial semiconductor device design;
    identifying, by the one or more computer processors, scannable cells within the initial semiconductor device design;
    determining, by the one or more computer processors, locations of the scannable cells;
    identifying, by the one or more computer processors, a first cluster of scannable cells among the scannable cells according to the locations of the scannable cells;
    forming, by the one or more computer processors, a scan chain configured to connect a first set of the scannable cells of the first cluster;
    determining, by the one or more computer processors, a first cost function value associated with a second set of the scannable cells of the first cluster, wherein the first cost function value is based upon a distance to a center of gravity of a second cluster, a number of scannable cells in the second set of scannable cells, and a maximum scan chain length;
    comparing the first cost function value to a threshold;
    forming a new scan chain from the second set of scannable cells in the first cluster, by the one or more computer processors, according to the first cost function value meeting or exceeding the threshold;
    shifting the second set of scannable cells to the second cluster, according to the first cost function value failing to meet the threshold;
    and
    identifying, by the one or more computer processors, a scan chain scan-multiplexer location for the first cluster.

2. The computer implemented method according to claim 1, wherein identifying the cluster of scannable cells comprises identifying the cluster according to design constraint data.

3. The computer implemented method of claim 1, further comprising identifying a scan pin location to a parent hierarchy for a single scan chain.

4. The computer implemented method according to claim 1, further comprising starting the scan chain near a center-of-gravity of the cluster and ending the scan chain after the maximum scan chain length.

5. The computer implemented method according to claim 1, further comprising generating a scan chain connector between the scan chain and a first scan multiplexer.

6. The computer implemented method according to claim 5, further comprising generating a scan chain connector between the scan chain and a second scan multiplexer according to a second cost function value.

7. A computer program product for semiconductor device design, the computer program product comprising one or more computer readable storage devices and program instructions collectively stored on the one or more computer readable storage devices, the stored program instructions comprising:

program instructions to receive an initial semiconductor device design;

program instructions to identify scannable cells within the initial semiconductor device design;

program instructions to determine scannable cell locations;

program instructions to identify a first cluster of scannable cells among the scannable cells according to the locations;

program instructions to form a scan chain configured to connect at least some of the scannable cells of the first cluster;

program instructions to determine a first cost function value associated with a second set of the scannable cells of the first cluster, wherein the first cost function value is based upon a distance to a center of gravity of a second cluster, a number of scannable cells in the second set of scannable cells, and a maximum scan chain length;

program instructions to compare the first cost function value to a threshold;

program instructions to form a new scan chain from the second set of scannable cells in the first cluster, by the one or more computer processors, according to the first cost function value meeting or exceeding the threshold;

program instructions to shift the second set of scannable cells to the second cluster, according to the first cost function value failing to meet the threshold; and program instructions to generate a scan chain scan-multiplexer location for the scan chain cluster.

8. The computer program product according to claim 7, wherein identifying the cluster of scannable cells comprises identifying the cluster according to design constraint data.

9. The computer program product according to claim 7, the stored program instructions further comprising program instructions to identify a scan pin location to a parent hierarchy for a single scan chain.

10. The computer program product according to claim 7, the stored program instructions further comprising program instructions to start the scan chain near a center-of-gravity of the cluster and end the scan chain after the maximum scan chain length.

11. The computer program product according to claim 7, the stored program instructions further comprising program instructions to generate a scan chain connector between the scan chain and a first scan multiplexer.

12. The computer program product according to claim 11, the stored program instructions further comprising program instructions to generate a scan chain connector between the scan chain and a second scan multiplexer according to a second cost function value.

13. A computer system for semiconductor device design, the computer system comprising:

one or more computer processors;

one or more computer readable storage devices; and stored program instructions on the one or more computer readable storage devices for execution by the one or more computer processors, the stored program instructions comprising:

program instructions to receive an initial semiconductor device design;

program instructions to identify scannable cells within the initial semiconductor device design;

program instructions to determine scannable cell locations;

program instructions to identify a first cluster of scannable cells among the scannable cells according to the locations;

program instructions to form a scan chain configured to connect at least some of the scannable cells of the first cluster;

program instructions to determine a first cost function value associated with a second set of the scannable cells of the first cluster, wherein the first cost function value is based upon a distance to a center of gravity of a second cluster, a number of scannable cells in the second set of scannable cells, and a maximum scan chain length;

program instructions to compare the first cost function value to a threshold;

program instructions to form a new scan chain from the second set of scannable cells in the first cluster, by the one or more computer processors, according to the first cost function value meeting or exceeding the threshold;

program instructions to shift the second set of scannable cells to the second cluster, according to the first cost function value failing to meet the threshold; and program instructions to generate a scan chain scan-multiplexer location for the scan chain cluster.

14. The computer system according to claim 13, wherein identifying the cluster of scannable cells comprises identifying the cluster according to design constraint data.

15. The computer system according to claim 13, the stored program instructions further comprising program instructions to identify a scan pin location to a parent hierarchy for a single scan chain.

16. The computer system according to claim 13, the stored program instructions further comprising program instructions to start the scan chain near a center-of-gravity of the cluster and end the scan chain after the maximum scan chain length.

17. The computer system according to claim 13, the program instructions further comprising program instructions to generate a scan chain connector between the scan chain and a first scan multiplexer.

* * * * *